United States Patent Office 2,894,932
Patented July 14, 1959

2,894,932

ADHESIVE COMPOSITION COMPRISING AN ACRYLATE MONOMER, AN UNSATURATED POLYESTER AND POLYVINYL METHYL ETHER

Erich Bäder, Hanau, and Hubert Koert, Gross-Auheim, Germany, assignors to Deutsche Gold- und Silber-Scheideanstalt vormals Roessler, Frankfurt am Main, Germany No Drawing. Application April 11, 1957
Serial No. 652,083

Claims priority, application Germany April 19, 1956

10 Claims. (Cl. 260—45.4)

The present invention relates to improved adhesive compositions which provide a good bond and have good resistance to peeling when employed as an adhesive for copper and zinc. The bond of the adhesive compositions according to the invention to porcelain, glass, synthetic resins and the like, also is excellent.

The use of mixtures of polymerizable organic compounds as adhesives, for example, for metals and the like, is already known. However, it has been found that their resistance to peeling in some instances leaves much to be desired and in particular the bonds produced with copper and zinc and their alloys have not been sufficiently durable.

The novel adhesive compositions according to the invention contain a combination of the following as the essential binding agents: a lower aliphatic ester of acrylic and methacrylic acid or ethacrylic acid, preferably methacrylic acid methyl ester; at least one unsaturated polyester resin; and at least one polyvinyl ether, preferably polyvinyl methyl ether, which is compatible with the dissolved polyester; and furthermore a hardening catalyst. The proportion of acrylic component to polyester and polyvinyl ether components can, for example, be 25–90%: 10–75%, related to the whole weight. Preferably, the proportions of the three components, acrylic component: polyester component: polyvinyl ether component is 25–90%: 5–10%: 10–60%.

Preferably, the unsaturated polyester resin component is one containing a relatively large number of double bonds and essentially composed of short chained aliphatic polyhydric alcohols, such as glycol, 1,3 propyl glycol and the like, and short chained unsaturated polybasic acids, such as fumaric acid, maleic acid and the like. In addition, such resins may contain certain quantities of higher glycols, such as hexane diols and the like, as well as higher dicarboxylic acids, such as adipic acid, phthalic acid and the like.

The adhesives according to the invention in addition to the three essential components given above can also, with reference to the organic adhesive, contain up to 30% of other monomeric substances, such as other acrylic or methacrylic acid esters, such as butyl methacrylate, vinyl acetate, styrene, vinyl toluol and the like. Also, other polymers, such as, for example, polyvinyl acetate, polyvinyl chloride, ketone aldehyde resins and the like, can be added in an amount up to 20%. In some instances it can also be desirable to add fillers, such as barium sulfate, powdered slate, finely divided silica and the like, in amounts up to 4 times the quantity of organic adhesive. Also, up to about 1% of paraffin can also be added.

The pot-life and hardening time of the adhesives according to the invention can be varied between a few minutes and several hours by selection of suitable polymerization initiator systems. Combinations of aromatic tertiary amines and/or α-amino sulfones with organic peroxides, such as benzoyl peroxide, are well suited for effecting rapid hardening at room temperatures. Substances with labile halogen atoms and/or small quantities of heavy metal compounds can be added to such catalysts as promoters. On the other hand, the adhesives can also be hardened with the aid of peroxides alone and heating.

As the adhesives according to the invention harden in a relatively short time after they have been prepared, it is expedient to provide two separate mixtures for storage, of which the first can contain the adhesives and, if desired, the reducing portions and co-catalysts of the Redox system and the second of which, the "hardening paste," contains the peroxide catalyst and, if desired, the α-amino sulfones distributed in a solvent or plasticizer. The two mixtures are then thoroughly mixed shortly before or during use and the mixture then applied to the surface to be bonded. It is also possible to apply the first mixture to one of the surfaces to be bonded and the second to the other surface to be bonded and then join such surfaces under light pressure, if necessary.

The following examples will serve to illustrate several embodiments of the invention.

Example 1

A binding agent mixture of the following composition was prepared:

40.0% unsaturated polyester resin (prepared from maleic acid, phthalic acid and 1,3 propyl glycol in a molar proportion of 2:1:3.1)
33.1% polyvinyl methyl ether (Lutonal M 40)
26.6% methacrylic acid methyl ester
0.3% dimethyl p-toluidine
0.05% hydroquinone The mixture was then admixed with 3% of a hardening paste composed of 50% benzoyl peroxide in dibutyl phthalate and employed to bond strips of various materials 20 mm. wide with a single 15 mm. overlap. The following table gives the results obtained:

| Material | Shear strength in kg./cm.² | |
|---|---|---|
| | after 15 hrs. at room temp. | with additional tempering 1 hr. at 120° C. |
| hardened light metal 2 mm. thick having a tensile strength of about 30 kg./mm.² | 175 | 220. |
| copper sheet 1.5 mm. thick with a tensile strength of 25 kg./mm.² | 220 | 220. |
| body steel sheet 1 mm. thick with a tensile strength of 37 kg./mm.² | 150 | 160. |
| hardened light metal and glass 3 mm. thick | 50, glass broke. | 40, glass broke. |

The peeling resistance measured on strip iron 0.2 x 20 mm. was 7–8 kg./cm.

Example 2

A binding agent mixture of the following composition was prepared:

33.2% unsaturated polyester resin as in Example 1
33.2% polyvinyl methyl ether (Lutonal M 40)
33.1% methacrylic acid methyl ester
0.4% diethylol-p-toluidine
0.02% hydroquinone This mixture was admixed with 3% of the hardening paste employed in Example 1 and also employed to bond strips of various materials 20 mm. wide with a 15 mm.

single overlap. The following table gives the results obtained:

| Material | Shear strength in kg./cm.² | |
|---|---|---|
| | after 15 hrs. at room temp. | with additional tempering 1 hr. at 120° C. |
| hardened light metal 2 mm. thick having a tensile strength of 30 kg./mm.² | 220 | 210. |
| copper sheet 1.5 mm. thick having a tensile strength of 25 kg./mm.² | 170 | 165. |
| body steel sheet 1 mm. thick having a tensile strength of 37 kg./mm.² | 145 | 150. |
| zinc sheet 1 mm. thick having a tensile strength of 15 kg./mm.² | 90–100, material rupture. | 90–100, material rupture. |
| hardened light metal and glass 3 mm. thick | 55, glass broke. | 45, glass broke. |
| melamine resin sheet 1.5 mm. thick (Resopal) | 40, material rupture. | |
| polymethyl methacrylate sheet 0.8 mm. thick (Plexiglas). | do | |

The good peeling and bending resistance of this adhesive is indicated in that the bonded strips of light metal and copper could be bent at a right angle right next to the bond without failure of the bond.

*Example 3*

A binding agent mixture of the following composition was prepared:

39.7% unsaturated polyester resin as in Example 1
24.0% polyvinyl methyl ether (Lutonal M 40)
28.8% methacrylic acid methyl ester
7.0% polyvinyl acetate (mol. wt. about 73,000)
0.5% dipropylol-p-toluidine
0.05% hydroquinone This mixture was admixed with 3% of the hardening paste employed in Example 1 and employed to bond strips of light metal and copper as in Example 1 with a single 15 mm. overlap. The shear strengths obtained with the light metal strips was 175 kg./cm.² after 15 hours at room temperature and 200 kg./cm.² after a further tempering for one hour at 120° C. Similarly, the shear strengths obtained with the copper strips was, respectively, 200 and 210 kg./cm.².

*Example 4*

A binding agent mixture of the following composition was prepared:

18.5% unsaturated polyester resin as in Example 1
15.3% polyvinyl methyl ether (Lutonal M 40)
19.7% methacrylic acid methyl ester
46.3% barium sulfate
0.2% dipropylol-p-toluidine
0.02% hydroquinone This mixture was mixed with 3% of the hardening paste employed in Example 1 and employed to bond light metal strips as in Example 1 with a single 15 mm. overlap. The shear strengths obtained was 180 kg./cm.² after 15 hours at room temperature and 190 kg./cm.² after a further tempering for one hour at 120° C.

*Example 5*

A binding agent mixture of the following composition was prepared:

40.0% unsaturated polyester resin as in Example 1
33.3% polyvinyl methyl ether (Lutonal M 40)
26.7% methacrylic acid methyl ester
0.07% phenylethyl-dibutylamine hydrochloride
0.5 γ Cu++/g. (as naphthenate)

This mixture was then admixed with 3% of a hardening paste composed of 40% of N-benzyl-di-(p-tolylsulfonmethyl)-amine, 20% of dichloro benzoyl peroxide and 40% of di-octyl phthalate and then employed to bond strips of light metal and strips of light metal and glass as in Example 1. The shear strength of the bond between the light metal strips was 180 kg./cm.² after 15 hours at room temperature.

In testing the shear strength of the bond between the light metal and glass strips after 15 hours at room temperature the glass broke at 35 kg./cm.².

The adhesive composition according to this example, contrary to those of the other examples, is colorless.

*Example 6*

A binding agent mixture of the following composition was prepared:

20% unsaturated polyester resin as in Example 1
35% polyvinyl methyl ether (Lutanol M 40)
44.86% methacrylic acid methyl ester
0.14% phenylethyl-dibutyl-amino acetic acid ethyl ester chloride
1 γ Cu++/g. (as naphthenate)

This mixture was then admixed with 3% of a hardening paste composed of 33.3% N-benzyl-di-(p-tolylsulfonmethyl)-amine, 16.7% dichloro-benzoyl peroxide and 50% di-butyl phthalate. When employed to bond strips of hardened light metal 20 mm. wide and 2 mm. thick having a tensile strength of 45 kg./cm.² with a single 10 mm. overlap, a shear strength of about 250 kg./cm.² was attained. When employed to bond strip iron 20 mm. wide and 0.2 mm. thick and the bond tested for peeling resistance on a Wolpert testing machine EZR 30, a peeling resistance of 4 kg./cm.² was attained.

*Example 7*

The following binding agent compositions were prepared employing the same polyvinyl methyl ether and unsaturated polyester resin as in Example 1:

| | No. 1 | No. 2 | No. 3 | No. 4 | No. 5 |
|---|---|---|---|---|---|
| polyvinyl methyl ether, percent | 25 | 30 | 20 | 30 | 30 |
| unsat. polyester resin, percent | 5 | 5 | 2.5 | | |
| methylmethacrylate, percent | 70 | 60 | 72.5 | 70 | 60 |
| vinyl toluol, percent | | 5 | 5 | | 10 |
| paraffin, percent | 0.1 | 0.1 | 0.1 | 0.1 | 0.1 |

These compositions were then admixed with 0.5% of diisopropylol-p-toluidine and these admixtures mixed with 3% of a hardening paste composed of equal parts of benzoyl peroxide and dibutyl phthalate and used to bond light metal strips as indicated in Example 6. The shear strengths attained with compositions 1–5, respectively, were 255, 300, 290, 185 and 140 kg./cm.².

*Example 8*

Using the same polyvinyl methyl ether and unsaturated polyester resin as in Example 1, the following binding agent compositions were prepared:

| | No. 1 | No. 2 |
|---|---|---|
| polyvinyl methyl ether, percent | 40 | 30 |
| unsaturated polyester resin, percent | 20 | 2.5 |
| methylmethacrylate, percent | 40 | 67.5 |
| paraffin, percent | 0.1 | 0.1 |

These compositions were then mixed with diisopropylol-p-toluidine and hardening paste as in Example 7 and employed to bond together iron strips 20 mm. wide and 0.2 mm. thick. The bonded strips were then tested upon a Wolpert testing machine EZR 30 for peeling resistance. The peeling resistance of composition No. 1 was 4.5–5.0 kg./cm. and that of composition No. 2 was 3.5–4.0 kg./cm.

Example 9

The following binding agent compositions were prepared employing the same polyvinyl methyl ether and unsaturated polyester resin as in Example 1 and a ketone aldehyde resin, that is a commercial product and can be bought under the trade name "Kunstharz AP" from Messrs. Chemische Werke Hüls, Marl, Kreis Recklinghausen, Germany.

|  | No. 1 | No. 2 |
|---|---|---|
| polyvinyl methyl ether, percent | 27 | 30. |
| unsaturated polyester resin, percent | 18 | 15. |
| methyl methacrylate, percent | 26 | 25. |
| vinyl toluol, percent | 10 | 8. |
| higher methacrylate, percent | 5 (decyl methacrylate). | 10 (butyl methacrylate). |
| ketone aldehyde resin, percent | 14 | 12. |
| paraffin, percent | 0.15 | 0.15. |
| diisopropylol-p-toluidine, percent | 2 | 1. |

27.5 parts of the respective compositions were mixed thoroughly with 72.5 parts of inorganic filler compound of 93% heavy spar, 5% powdered slate and 2% finely divided silica (Aerosil, obtained by the vapor phase hydrolysis of silicon tetrachloride in a flame obtained by combustion of hydrogen containing gases). After addition of 4% of a hardening paste composed of equal parts of benzoyl peroxide and dibutylphthalate, the adhesive compositions were employed to bond iron strips 2 mm. thick and 20 mm. wide with a 10 mm. overlap. The shear strength obtained with the adhesive prepared from composition 1 was about 225 kg./cm.² and that obtained with the adhesive prepared from composition 2 was 190 kg./cm.². The peeling resistance of the adhesive compositions was also tested as in Example 8, the adhesive prepared from composition No. 1 giving a value of 2 kg./cm. and that prepared from composition No. 2 giving a value of 2.5.

The compositions according to this example were suitable as spatcheling and filling masses, as well as as adhesives.

We claim:

1. An adhesive composition containing as essential binding agent a combination of at least one lower aliphatic ester of an acrylic acid selected from the group consisting of acrylic, methacrylic and ethacrylic acids, at least one unsaturated polyester resin obtained by the esterification of a short chained aliphatic dihydric alcohol and a short chained ethylenically unsaturated aliphatic dicarboxylic acid and at least one polyvinyl methyl ether compatible with the polyester resin and also containing a catalytic organic peroxide as a hardening catalyst the proportion of acrylic compound to polyester to polyvinyl alkyl ether being 25–90%:5–50%:10–60%.

2. An adhesive composition according to claim 1 in which 10–75 parts of polyester and polyvinyl ether are present per 25–90 parts of acrylic compound, referred to the whole weight.

3. An adhesive composition according to claim 1 in which the acrylic compound is methyl methacrylate.

4. An adhesive according to claim 1 which also contains up to 30% calculated on the binding agent combination of another polymerizable organic monomer containing a

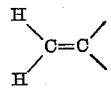

group.

5. An adhesive according to claim 1 which also contains up to 20% of another synthetic organic resin selected from the group consisting of polyvinyl resins and ketone aldehyde resins.

6. An adhesive according to claim 1 which also contains an inorganic filler in a quantity up to 4 times that of the binding agent combination.

7. An adhesive according to claim 1 in which said hardening catalyst comprises an organic peroxide and a tertiary amine.

8. An adhesive according to claim 1 in which said hardening catalyst comprises an organic peroxide and an α-amino sulfone.

9. An adhesive according to claim 1 in which said hardening catalyst comprises an organic peroxide and a catalytic heavy metal compound.

10. An adhesive according to claim 1 in which said hardening catalyst comprises an organic peroxide and a compound containing a labile halogen atom.

References Cited in the file of this patent

UNITED STATES PATENTS

| 2,300,587 | Menger | Nov. 3, 1942 |
| 2,319,826 | Pellett | May 25, 1943 |
| 2,353,910 | Lawler et al. | July 18, 1944 |